July 22, 1924.

L. G. PEPIN 1,502,583

CARRIER

Filed May 9, 1923

Leonce G. Pepin.
INVENTOR

BY Victor J. Evans.
ATTORNEY

WITNESS:

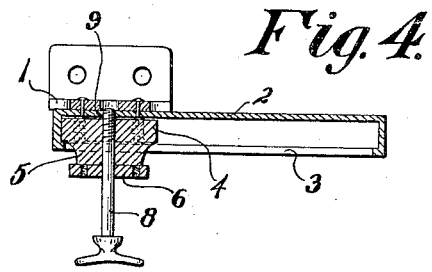
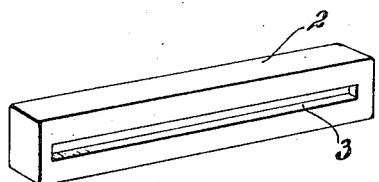
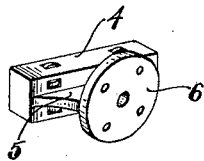
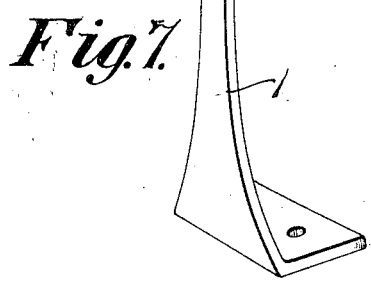
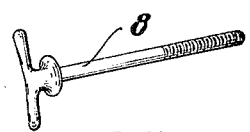

Patented July 22, 1924.

1,502,583

UNITED STATES PATENT OFFICE.

LEONCE G. PEPIN, OF AUGUSTA, MAINE.

CARRIER.

Application filed May 9, 1923. Serial No. 637,817.

*To all whom it may concern:*

Be it known that I, LEONCE G. PEPIN, a citizen of the United States, residing at Augusta, in the county of Kennebec and State of Maine, have invented new and useful Improvements in Carriers, of which the following is a specification.

This invention relates to improvements in tire carriers, the general object of the invention being to provide means for permitting wheels which are arranged at the sides of motor vehicles to be easily and quickly moved away from the hinged part of the hood of the motor to permit said part to be raised to inspect the motor.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a section on line 4—4 of Figure 3.

Figures 5 and 6 are detail views.

As is well known when spare wheels are carried at the side of an automobile it is a difficult matter to raise the hood to inspect the engine as the wheel is in the way and it is necessary to remove the wheel from the carrier before the hood can be raised. It is the object of my invention to provide means for permitting the wheel to be moved rearwardly so that the hood can be opened and then returned to its original position after the hood is closed.

Figure 1:
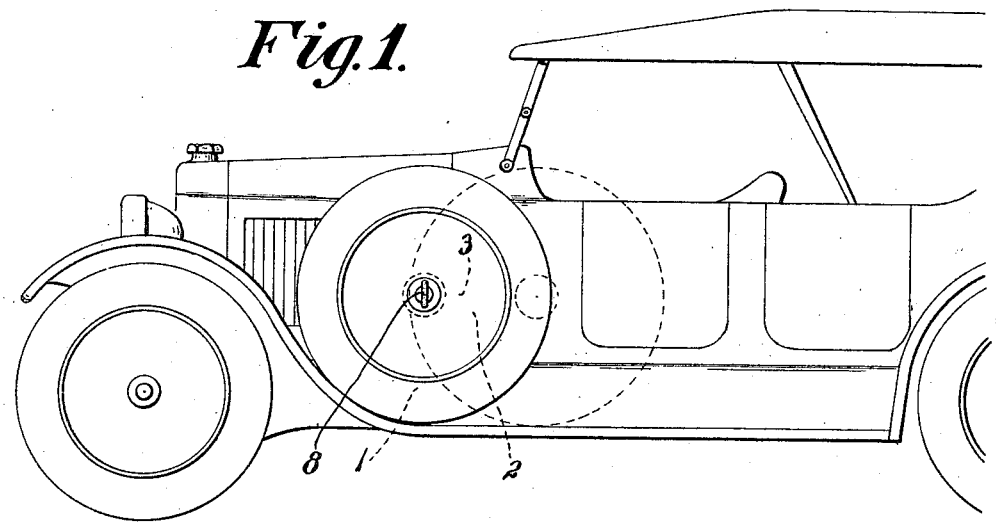
Figure 1 is a side view of an automobile showing the invention in use.
Figure 2:
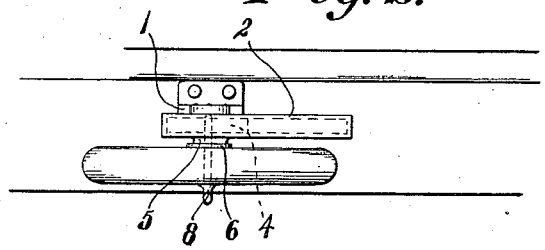
Figure 2 is a plan view.
Figure 3:
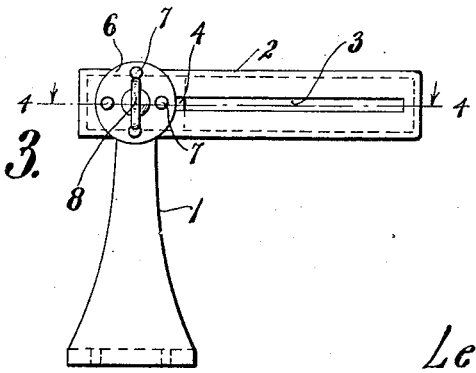
Figure 3 is an enlarged view of the improved tire carrier itself.

In carrying out my invention I provide a carrier which consists of a standard 1 adapted to be bolted or otherwise secured to the running board of a vehicle, and a casing 2 which is connected with the top of the standard. This casing has its front side provided with a slot 3. A block 4 is slidably arranged in the casing and said block has a part 5 thereon which extends through the slot and to which a disc 6 is secured, said disc being arranged to receive the hub of the spare wheel which is bolted thereto by the bolt 7 or which is secured thereto in any other desired manner. A lock bolt 8 has its shank passing through the disc, the part 5 and the block with its threaded part arranged to engage a threaded hole 9 in the casing so as to hold the parts against movement in the casing. By giving the bolt a few turns its threaded part will be disengaged from the threaded hole so that the block and the parts attached thereto can be moved in the casing. The hole is so located in the casing that when the bolt is engaging the same the parts will be held over the standard so that the spare wheel is located at the base of the front fender, as shown in Figure 1. When it is desired to inspect the motor the bolt is given a few turns to disengage it from the threaded hole and then the parts are moved to the rear end of the casing so that one can raise the hood without interference on the part of the wheel which is then in the position shown in dotted lines in Figure 1. After the hood is in place the parts are returned to normal position and locked therein by means of the bolt. This same arrangement of parts, with a slight modification, can be placed at the rear of a motor vehicle so that the spare wheel or tire can be moved to one side so as to permit access to a trunk placed at the rear of the automobile.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A carrier of the class described comprising a support, a casing carried thereby and having a slot therein, a member slidably arranged in the casing and having a portion projecting through the slot, a supporting disc carried by said part and means for locking the sliding member at one end of the casing.

2. A carrier of the class described comprising a standard, a slotted casing connected with the upper end of the standard and extending at right angles therefrom, a block slidably mounted in the casing and having a part extending through the slot, a disc connected with said part and a locking bolt passing through the disc and the block and arranged to engage the slotted hole at the front end of the casing.

In testimony whereof I affix my signature.

LEONCE G. PEPIN.